United States Patent
Thomson (10) Patent No.: US 12,202,614 B2
(45) Date of Patent: Jan. 21, 2025

(54) POWER SOURCE FOR INFLATION SYSTEM (THERMAL BATTERY)

(71) Applicant: Air Cruisers Company, LLC, Wall Township, NJ (US)

(72) Inventor: Christian Thomson, Wall Township, NJ (US)

(73) Assignee: Air Cruisers Company, LLC, Wall Township, NJ (US)

( * ) Notice: Subject to any disclaimer, the term of this patent is extended or adjusted under 35 U.S.C. 154(b) by 749 days.

(21) Appl. No.: 17/379,536

(22) Filed: Jul. 19, 2021

(65) Prior Publication Data

US 2023/0130227 A1   Apr. 27, 2023

(51) Int. Cl.
| | | |
|---|---|---|
| *H02J 7/00* | (2006.01) | |
| *B64D 25/00* | (2006.01) | |
| *B64D 25/14* | (2006.01) | |
| *H01M 6/36* | (2006.01) | |
| *H01M 10/615* | (2014.01) | |
| *H01M 50/24* | (2021.01) | |
| *B63C 9/04* | (2006.01) | |

(52) U.S. Cl.
CPC ............ *B64D 25/14* (2013.01); *B64D 25/00* (2013.01); *H01M 6/36* (2013.01); *H01M 10/615* (2015.04); *H01M 50/24* (2021.01); *B63C 2009/042* (2013.01); *H01M 2220/20* (2013.01)

(58) Field of Classification Search
CPC .. B64D 25/00; B64D 25/14; B63C 2009/042; H01M 6/36; H01M 10/615; H01M 50/24; H01M 2220/20
USPC ............................ 320/101, 118, 127; 441/80
See application file for complete search history.

(56) References Cited

U.S. PATENT DOCUMENTS

| | | |
|---|---|---|
| 3,048,643 A | 8/1962 | Winckler et al. |
| 3,523,065 A | 8/1970 | Schmidt |
| 5,100,170 A | 3/1992 | Mihm et al. |
| 5,167,426 A | 12/1992 | Mihm et al. |
| 5,251,851 A | 10/1993 | Herrmann et al. |
| 9,637,210 B2 | 5/2017 | Thomson |

(Continued)

FOREIGN PATENT DOCUMENTS

| | | |
|---|---|---|
| EP | 3822170 A1 | 5/2021 |
| RU | 177432 U1 | 2/2018 |
| WO | 2022117453 A1 | 6/2022 |

OTHER PUBLICATIONS

Baldwin, Samsung Reveals Breakthrough: Solid-State EV Battery with 500-Mile Range, Car and Driver, Available Online at: https://www.caranddriver.com/news/a31409442/samsung-solid-state-battery-revealed/, Mar. 12, 2020, 8 pages.

(Continued)

*Primary Examiner* — Zixuan Zhou
(74) *Attorney, Agent, or Firm* — Kilpatrick Townsend & Stockton LLP (57) ABSTRACT

A power source for inflation systems. Specific embodiments relate to inflation systems that use an electrically powered inflation system, wherein the power source of the inflation system is a thermal battery. Particular embodiments may find use in connection with inflating evacuation slides or life rafts on board a passenger transportation vehicle, such as an aircraft or marine vessel. Other embodiments may be used for inflating shelters, life vests, or any other inflatable safety device that requires a rapid inflation.

13 Claims, 7 Drawing Sheets

(56) References Cited

U.S. PATENT DOCUMENTS

| | | | |
|---|---|---|---|
| 12,060,886 B2 | 8/2024 | Jeffers | |
| 2008/0110365 A1* | 5/2008 | Rastegar | F42C 15/24 |
| | | | 429/112 |
| 2012/0060267 A1 | 3/2012 | Blenkarn et al. | |
| 2012/0088134 A1* | 4/2012 | Wood | E21B 33/06 |
| | | | 429/90 |
| 2016/0107733 A1* | 4/2016 | Thomson | F04D 29/4206 |
| | | | 417/53 |
| 2021/0009276 A1 | 1/2021 | Haynes et al. | |
| 2021/0139153 A1 | 5/2021 | Haynes et al. | |
| 2022/0009642 A1 | 1/2022 | Shen et al. | |
| 2022/0082105 A1 | 3/2022 | Kuppan et al. | |

OTHER PUBLICATIONS

Baldwin, Toyota's Quick-Charging Solid-State Battery Coming in 2025, Car and Driver, Available Online at: https://www.caranddriver.com/news/a33435923/toyota-solid-state-battery-2025/, Jul. 27, 2020, 9 pages.

French Application No. 2300373, Office Action, First mailed on Apr. 17, 2023, 2 pages.

French Application No. 2300373, Office Action, Second mailed on Apr. 17, 2023, 2 pages.

French Application No. 2300374, Office Action, First mailed on Apr. 17, 2023, 2 pages.

French Application No. 2300374, Office Action, Second mailed on Apr. 17, 2023, 2 pages.

U.S. Appl. No. 17/379,874, Non-Final Office Action mailed on Nov. 15, 2023, 10 pages.

France Application No. 2300373, Search Report mailed on Aug. 23, 2023, 19 pages (11 pages of Original Document and 8 pages of English Translation).

France Application No. 2300374, Search Report mailed on Aug. 24, 2023, 20 pages (11 pages of Original Document and 9 pages of English Translation).

Zhang et al., An Advanced Ni-graphite Molten Salt Battery With 95 Operating Temperature for Energy Storage Application, Chemical Engineering Journal, vol. 435, Feb. 7, 2022, 11 pages.

U.S. Appl. No. 17/379,874, Notice of Allowance mailed on Mar. 14, 2024, 9 pages.

U.S. Appl. No. 17/379,874, Supplemental Notice of Allowability mailed on Jul. 15, 2024, 6 pages.

* cited by examiner

POWER SOURCE FOR INFLATION SYSTEM (THERMAL BATTERY)

FIELD OF THE DISCLOSURE

Embodiments of the present disclosure relate generally to a power source for inflation systems. Specific embodiments relate to inflation systems that use an electrically powered inflation system, wherein the power source of the inflation system is a thermal battery. Particular embodiments may find use in connection with inflating evacuation slides or life rafts on board a passenger transportation vehicle, such as an aircraft or marine vessel. Other embodiments may be used for inflating shelters, life vests, or any other inflatable safety device that requires a rapid inflation.

BACKGROUND

An evacuation slide is an inflatable slide used to allow passengers and crew to evacuate an aircraft in the event of an emergency. An evacuation slide is required on all passenger-carrying aircraft where the door sill height cannot allow evacuation of persons from the door uninjured. Currently, the Federal Aviation Administration (FAA) requires slides on all aircraft doors where the floor is 6 feet (1.8 m) or more above the ground. Such slides are generally provided with one or more inflatable chambers.

Evacuation slides are typically packed and held within the door structure inside the slide/door bustle, which is a protruding part inside an aircraft door. Alternatively, the slide may be packed within a fuselage enclosure located under or near the door or wing. A slide bustle typically houses the evacuation slide, as well as the inflation system that will be used to inflate the slide. Many but not all slides are also designed to double as life rafts in case of a water landing and evacuation.

Figure 1:
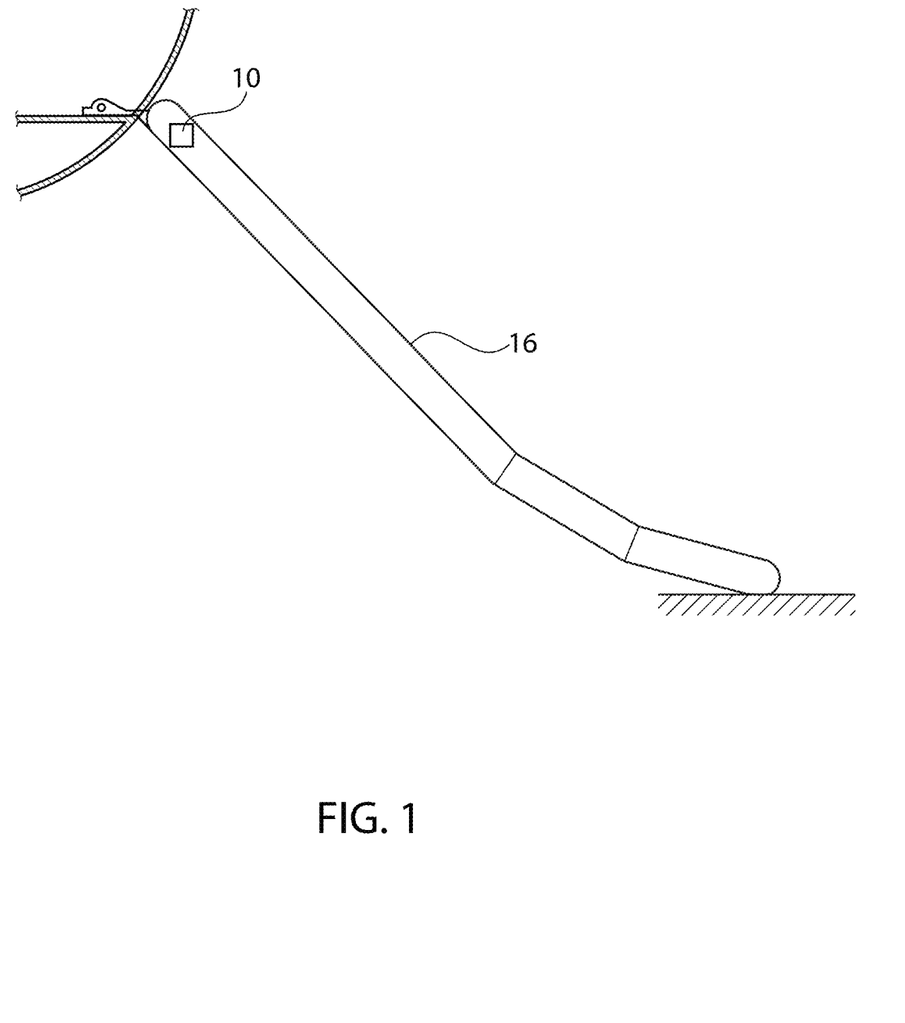
FIG. 1 is a side schematic view illustrating a deployed evacuation slide from an aircraft.

It is desirable for evacuation slides and/or life rafts to inflate quickly and reliably. The FAA currently requires evacuation of the entire aircraft in 90 seconds using 50% of the available evacuation exits in dark-of-night. To meet this requirement, evacuation slides should deploy in less than 10 seconds, and in many instances, should deploy in less than 6 seconds. In some examples, the evacuation slides should deploy in about 3 seconds. A successful evacuation slide deployment should be complete in about 5-7 seconds (depending upon weather conditions, such as temperature and winds) at all relevant atmospheric pressure conditions. These factors can affect performance of various slide deployment features described herein. Life rafts are typically required to be fully deployed and boardable by the first occupant within one minute after the start of inflation. (Although exemplary deployment conditions are described herein, it should be understood that government regulations may change, and accordingly, inflatable safety device deployment goal times and battery load requirements may be altered accordingly.) A deployed evacuation slide 16 from an aircraft door is illustrated by FIG. 1. A high pressure of gas is thus required to make evacuation slide and/or life raft deployment happen in the desired time period.

Inflation systems for these types of evacuation slides and/or life rafts generally use compressed gas for inflation. For example, the evacuation slide and/or life raft may be coupled with a container of compressed gas used to inflate the structure. One or multiple chambers of the safety system may be inflated upon (or before) deployment of the safety system.

In use, if the aircraft doors are opened while the slide bustle is in an armed state, opening of the door pulls the slide pack out of the slide bustle. Once freed, the slide will fall (under gravity), pulling a pin from a valve of a container containing compressed gas and causing the slide to inflate. Currently, evacuation slides and life rafts use non-explosive, inert gas inflation systems. Similar systems are also used for life rafts.

The inflation system usually includes a pressurized cylinder, a regulating valve, high pressure hoses, and aspirators. The cylinder can be from about 100 to about 1600 cubic inches and filled to about 3000 to 3300 psig with either gaseous nitrogen, or a mixture of gaseous $CO_2$ and nitrogen. In order to accommodate weight considerations, most cylinders are now made of aluminum or alloy cores wrapped with fiberglass, carbon fiber or other lightweight materials rather than steel, but weight reductions are still desirable. The regulating valve is used to mechanically meter out the gas at a desired rate.

However, inflation of the evacuation slides and life rafts using compressed gas can present various challenges. For example, compressed gas can be dangerous, difficult to transport, and prone to leaks. Compressed gas containers also carry an associated size and weight, which can be undesirable on board an aircraft where size and weight are at a premium. Accordingly, improved inflation systems are desirable.

Figure 2:
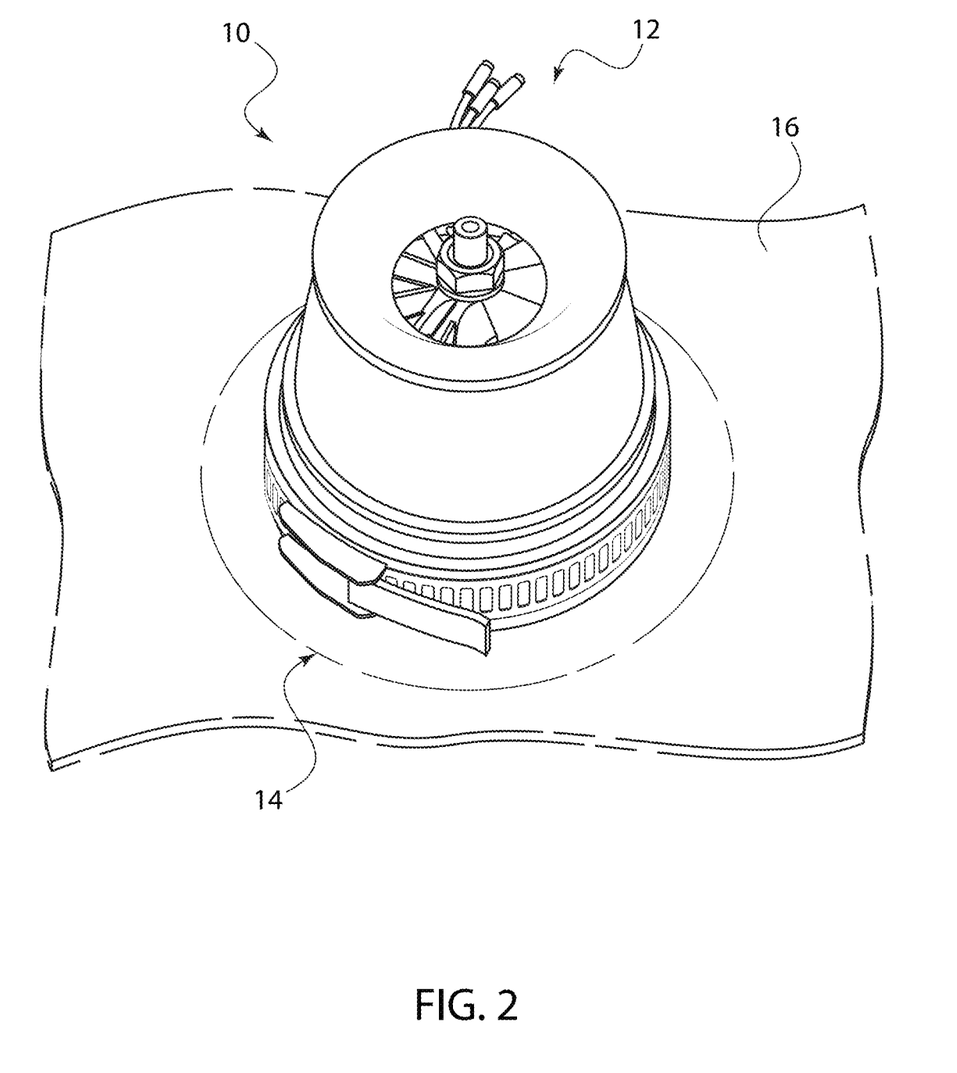
FIG. 2 is a side perspective view of one embodiment of an electrically powered inflation system.

The current assignee has thus developed an electric powered inflation system, which is shown and described in U.S. Pat. No. 9,637,210, the entire disclosure of which is hereby incorporated by reference. That patent provides an electrically powered inflation system for inflating an inflatable structure on-board a passenger transportation vehicle. The inflation system includes a compressor wheel mounted with respect to a motor mount and a compressor housing. An electric motor is provided to impart rotational speed to the compressor wheel. In some embodiments, the compressor wheel has a cone-shaped backplate that supports curved blades. In use, ambient air enters an intake inlet along the inlet axis and exits the compressor wheel at a diagonal angle with respect to the inlet axis. One example of an electrically-powered inflation system 10 is shown by FIG. 2.

Previous battery technologies used for household and/or leisure-use inflatables (and other types of non-safety inflatables) have not been acceptable for inflating passenger life rafts or evacuation slides, which must inflate within certain time limits for their use as safety devices. Additionally, battery size and weight are primary considerations for use on board aircraft. In the past, in order to have enough power to run an inflation system for long enough to inflate an entire unit, batteries have had to be quite large and heavy. With newer battery technologies, the amount of energy stored in the same weight and space can be increased. Additionally, newer batteries can have a higher rate of discharge.

The '210 patent describes various battery options, including a lithium metal oxide battery or a lithium ion battery (one specific example of which is an 18650 lithium cell battery, such as the Molicel lithium ion rechargeable battery). Other power sources described are a fuel cell or a generator, such as a gas generator. However, the present inventors have continued to explore improved battery source options for their electrically powered inflation system. Exemplary improved power sources are described herein.

SUMMARY

Accordingly, the present inventors have developed alternative power sources for use with electrically-powered inflation systems that inflate evacuation slides and/or life rafts, as well as other inflatable safety equipment.

In one example, there is provided an inflation system for an inflatable safety device, comprising an electrically-powered motor; a thermal battery that provides a power source for the electrically-powered motor, wherein the thermal battery is activated upon a battery activation event, wherein once the thermal battery is activated, power from the thermal battery is delivered to the electrically-powered motor upon an inflation initiation event.

In any of the preceding or subsequent examples, the battery activation event comprises one or more of:
motion or opening of a vehicle door or handle;
manual activation via a mechanical connection between the door/handle and the battery;
activation or tensioning of a release feature, cable, cord, pin, or webbing;
via electrical activation,
via a signal from the cockpit;
via a signal or action from one of the pilots, flight attendants, passengers, or other crewmembers;
via a standby electrical device;
or any combination thereof.

In any of the preceding or subsequent examples, there is provided a sensor that can detect movement of an aircraft door or handle in order to function as a battery activation event.

In any of the preceding or subsequent examples, the inflation initiation event comprises one or more of:
a time-based activation, such that a certain amount of time after the battery activation event, a timer activates a controller to activate the motor;
activation of battery itself activates the controller;
removal of the inflatable safety device from its storage compartment;
dropping of the inflatable safety device via gravity;
the ejection of the pack via an ejection system;
via a rip cord, cord, cable, webbing, switch, or pull pin that is caused to be activated (either via gravity or by aircraft personnel or occupants;
via a second sensor or switch connected to the door that activates a controller (54) once the door has been opened a certain amount;
via remote control;
via water contact or a water activated trigger activated by a water contact/presence sensor;
via orientation or movement of the system;
or any combination thereof.

In any of the preceding or subsequent examples, there may be provided a pressure sensor or switch that can monitor inflation pressure, wherein if inflation pressure drops below a predetermined threshold, a signal is sent to switch the electrically-powered motor back on.

In any of the preceding or subsequent examples, the thermal battery may be in direct contact with the electric powered motor or is positioned a distance from the electric powered motor.

In any of the preceding or subsequent examples, the thermal battery is located on the inflatable safety device, on a packboard assembly, in an enclosure of the inflatable safety device, in a carrying case container, or on a vehicle door.

In any of the preceding or subsequent examples, the inflatable safety device comprises an evacuation slide and wherein the thermal battery delivers about can deliver about 5-20 kW of power.

In any of the preceding or subsequent examples, the inflatable safety device comprises a life raft and wherein the thermal battery delivers about 100-2000 watts of power.

In any of the preceding or subsequent examples, the inflatable safety device comprises a life jacket and wherein the thermal battery delivers about 5-50 watts of power.

In any of the preceding or subsequent examples, the inflatable safety device may be an inflatable shelter and wherein the thermal battery delivers about 50-2000 watts of power.

In any of the preceding or subsequent examples, the thermal battery comprises a load profile that provides a high burst of power within at least about 3-60 seconds and provides a sustained option for powering the electric powered motor during inflation and relevant usage time of the inflatable safety device.

In any of the preceding or subsequent examples, the thermal battery may have a volume of about 6-100 cubic inches.

In any of the preceding or subsequent examples, the thermal battery comprises a molten salt battery with a plurality of cells comprising a salt electrolyte (42), an anode (38), and a cathode (44), wherein the plurality of cells are enclosed by a battery case, wherein the salt electrolyte is solid and inactive at temperatures in the range of −65° F. to 185° F. and undergoes a phase change to liquid once activated via a battery activation mechanism.

The terms "invention," "the invention," "this invention" "the present invention," "disclosure," "the disclosure," and "the present disclosure," used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

DETAILED DESCRIPTION

One of the problems experienced with electrically powered inflation systems is identifying a viable power source.

As background, aircraft evacuation slides are required to be deployed extremely quickly. In most instances, an entire slide must be inflated in as short as six seconds. The aircraft evacuation slide should also stay deployed during its entire use period, which, under current regulations is about 90 seconds. (Government regulations require that an aircraft have a sufficient number of evacuation slides and evacuation doors that allow the entire aircraft to be evacuated within 90 seconds of an emergency event.) Accordingly, the power source for the inflation system must be capable of delivering a very high power output for the first 1-6 seconds of operation in order to fully and quickly inflate the slide. It should also be able to maintain inflation for the duration of use, which, in most instances will be at least 90 seconds. (Although this disclosure is described in connection with aircraft evacuation slides, it should be understood that the power systems described herein are usable in connection with any other type of inflatable safety device, such as evacuation slides, evacuation slide/rafts, life rafts, emergency floats, emergency flotation systems, life preservers, inflatable decontamination shelters, inflatable shelters, inflatable military shelters, aviation life rafts, marine life rafts, ship decoys and inflatable military targets, space applications of the aforementioned, or any combination thereof.)

In order to achieve a weight and size target when using an electrically-powered inflation system, a small, lightweight but powerful energy source is needed. There are many options to power an electrically-powered inflation system, but most entail significant drawbacks, including performance, weight, charging, storage, and safety problems.

For example, one downside of using a lithium ion battery is that it requires liquid or gel electrolytes, which can be unstable at certain temperature ranges. Liquid electrolyte lithium-ion batteries may also exhibit decreased performance at low temperatures. The internal resistance of the battery increases with cycling and age, which reduces maximum current draw. Eventually, this increasing internal resistance can leave a lithium ion battery in a state such that it can no longer support the normal discharge currents required for powering the inflation motor without unacceptable voltage drop or overheating. Furthermore, lithium-ion batteries contain a flammable electrolyte that may explode or combust if overheated, damaged, or otherwise exposed to high or low temperatures or pressures.

Accordingly, embodiments of the present disclosure provide a thermal battery used to power an electrically-powered inflation system. A thermal battery uses a solid electrolyte that transitions to a liquid upon activation. In one example, the thermal battery may be called a "molten-salt battery." This type of thermal battery uses salt as an electrolyte. The salt is solid and inactive at ambient temperatures. For example, the salt is stable at operating temperature ranges from about −65° F. up to about 160° F. The salt also needs to remain stable during storage at temperatures up to about +185° F. This can add to the safety and store-ability of the electrically-powered inflation system because an aircraft evacuation slide may be subjected to extreme temperatures when being stored and not in use.

Figure 3:
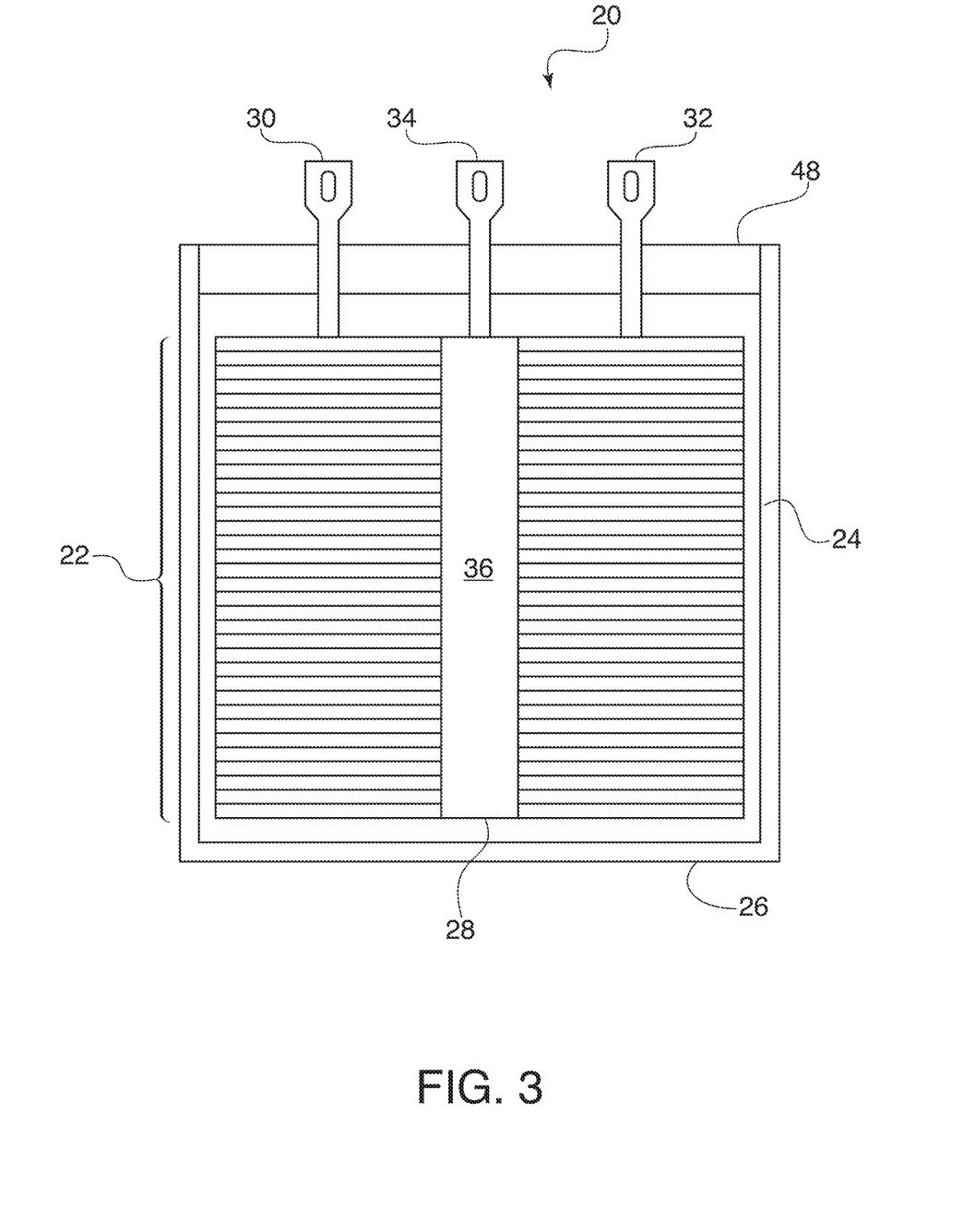
FIG. 3 is a side cross-sectional view of one embodiment of a stack of multiple cells of a thermal battery.
Figure 4:
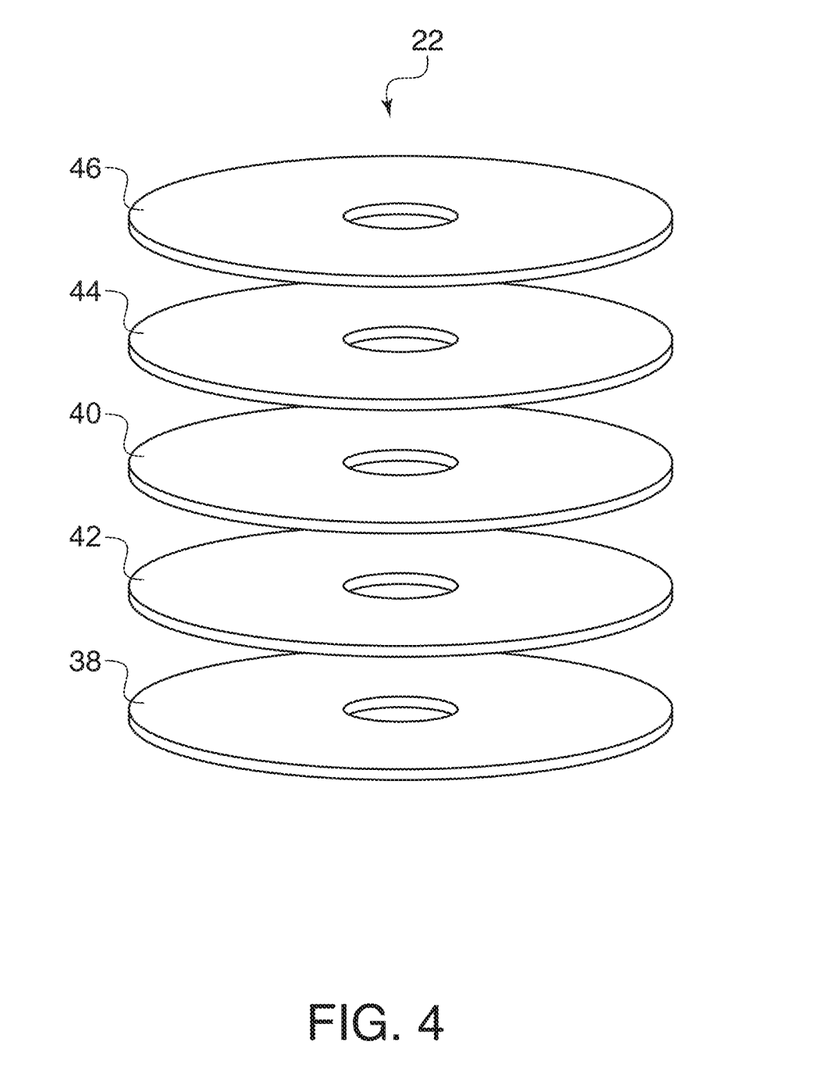
FIG. 4 is an exploded view of a thermal battery cell.

As shown by FIGS. 3 and 4, the thermal battery 20 can incorporate one or more cells 22, connected in series or parallel, depending on the desired output voltage and capacity. Referring now to FIG. 3, surrounding the cells 22 is a layer of insulation 24. The amount of insulation 24 use can be altered in order to manage the external heat experienced by the area surrounding the thermal battery 20. The cells 22 and insulation 24 of the thermal battery 20 are housed by a case 26. Along at least one of the case walls, is an ignition hole 28, via which a battery activation mechanism, such as an igniter or an electrolyte heating source can activate the thermal battery 20. The ignition hole 28 is shown along a base wall of the case 26, but it should be understood that other positions are possible and considered within the scope of this disclosure. A plurality of terminals are positioned along an upper surface of the thermal battery case. (Similarly, terminals may be positioned along any other surface of the case.) The terminals shown are a positive terminal 30, a negative terminal 32, and an ignition terminal 34. A channel or opening 36 extends between the ignition hole 28 and the ignition terminal 34. The case 26 may also be provided with a protective seal 48.

Referring now to FIG. 4, the cell 22 includes three major components. First, the anode 38 or negative electrode gives up electrons to the external circuit and is oxidized during the electrochemical reaction. Second, the cathode 44 or positive electrode accepts electrons from the external circuit." Third, the electrolyte 42 provides the medium for transfer of charge, as ions, inside the cell and is located between the anode 38 and the cathode 44. The electrolyte 42 of the thermal battery 20 is a solid at temperatures in the range of −65° F. to 185° F. Also included in the thermal battery cell stack is a heat source 40. Activation of the heat source 40 causes the electrolyte 42 to change from a solid to a liquid. A current collector 46 may also be provided, which has a low electrical resistance and functions as a pathway to feed electrons from the cell to the battery terminals.

The cells 22 may be provided in any appropriate shape and configuration. Although they are illustrated as circular discs, it should be understood that they may be rectangular, square, triangular, or any other appropriate shape. Additionally, it is possible for the thermal battery to have a single stack, two cell stacks, three cell stacks, or any other appropriate number of cell stacks.

In one specific example, the thermal battery can work through a chemical reaction of a lithium salt mixture. As long as the electrolyte (salt) is solid, the battery is inert and remains inactive. The electrolyte remains solid and inactive at temperatures in the range of −65° F. to 185° F. A battery activation mechanism (such as an ignitor, pyrotechnic heat source, or other option, described in more detail below) sets off pyrotechnic reactions in each cell, which increases the temperature to the melting point of the electrolyte 42. The battery activation mechanism can be a pyrotechnic heat source that is used to heat the cells to the typical operating temperature of 750-1025° F. Once activated, the thermal battery 20 provides a burst of high power for a relatively short period, with output ranging from watts to kilowatts. The high power is due to the high ionic conductivity of the molten salt (resulting in a low internal resistance), which is generally three orders of magnitude (or more) greater than that of the sulfuric acid in a lead-acid car battery. It is generally desirable for the electrolyte to remain molten for the duration of the electrically-powered inflation system use. In examples described herein, that is at least 90 seconds or more, but it should be understood that this duration of use may change.

When inflation is required, the thermal battery is activated by a battery activation mechanism, which may be an electrolyte heating source, a thermal means, or any other appropriate activating and/or heat source. The battery activation mechanism heats the electrolyte 42 and causes a phase change of the electrolyte from a solid to a liquid. Once activated by heating, the molten-salt electrolyte creates electricity and provides a high burst of power for a short instance. The heat source used to melt the salt electrolyte may be a pyrotechnic heat source contained within the battery or may be any other appropriate external heat source. In one specific example, the activation mechanism that activates the heat source can be integrated into the battery case 26 at the ignition hole. The activation mechanism may be a percussion primer, a pyrotechnic pellet, a squib, or any other activation mechanism capable of activating the heat source. It is also possible for the activation mechanism to be a mechanical activation means that does not require an electrical current.

One of the benefits of using a thermal battery in this disclosure is that a thermal battery can be stored indefinitely yet provide full power in an instant when required. The thermal battery is capable of supplying the necessary power to the inflation system and also meets safety, storage, and performance requirements. Typically, thermal batteries have traditionally been used in single-use systems that require low energy or extremely short bursts of energy. For example, in the past, thermal batteries have been used almost exclusively for military applications, notably for guided missile systems. These systems typically need only small amounts of current draws for short periods of time. Additionally, the heat of the battery on these types of systems is not a concern. However, for the uses described herein, it may be desirable to provide additional insulation to the thermal battery in order to prevent it from burning or melting the inflatable device.

The thermal battery of this disclosure can be designed to provide high power for a longer duration and for multiple occurrences, if need be. The load profile should provide a very high power output for a short period of time (e.g., about 1 to 6 seconds) until the evacuation slide is inflated. Then, the load profile should continue to deploy (or otherwise be available to top off a potential leak) for the evacuation slide use duration (e.g., at least about 60-120 seconds). The load profile can be altered based on necessary flow rates in order to reach the desired inflation parameters, as well as necessary inflation pressures in order to maintain the desired inflation parameters.

If the thermal battery is used in connection with an inflation system for a life raft or life vest, it is desirable for the thermal battery to activate the motor until the battery is fully depleted (e.g., so that the motor remains active and available for inflating or otherwise topping off the life raft or life vest until the thermal battery power source is no longer functional.)

Exemplary flow rates of the electrically-powered inflation system may include from about 10 to about 2400 cubic feet per minute (CFM). For example, the electrically powered inflation system may inflate a life raft at about 15 CFM to about 320 CFM. The electrically powered inflation system may inflate inflatable shelters at about 15 CFM to about 320 CFM. The electrically powered inflation system may inflate an evacuation slide at about 340 CFM to about 2250 CFM. (The flow rate for evacuation slides is generally desirably higher than that of rafts or shelters because evacuation slides must inflate in a shorter amount of time than that required for rafts and shelters.) These ranges are provided for exemplary purposes only, in order to illustrate some initial flow rates that have been achievable.

Exemplary inflation pressures include from about 1 to about 120 pounds per square inch gage (psig). For example, the electrically powered inflation system described by the '210 patent may inflate a life raft at about 1.0-3.5 psig or from about 1.0-4.0 psig; may inflate an evacuation slide at about 1.0-3.5 psig or from about 1.0-4.0 psig; and/or may inflate an inflatable shelter at about 30-120 psig. (The pressure for inflatable shelters is generally higher because the tubes that make the shelters are generally of small diameter.)

In order to design the thermal battery to function this way, it is possible to add and remove cells of different sizes in order to reach the desired load profiles. It is also possible to insulate the thermal battery differently in order to alter how long the battery provides power and/or to alter heat output/temperature of the battery in use. It should be understood that differently-sized inflatable devices for use with differently-sized aircraft may require different load profiles. One of ordinary skill in the art would understand how to modify the disclosed thermal battery in order to reach the desired load profiles. When designing load profiles, the amount of time that the battery needs to provide power as well as the desired amount of voltage can be considered.

It is generally envisioned that the thermal batteries described herein are designed to be single-use batteries. However, it is possible to provide options that allow recharge of the batteries.

Specific dimensions and features of an exemplary thermal battery are now provided. It should be understood, however, that these details are provided for illustrative purposes only, and that different sizes, weights, dimensions, and materials are possible for use. In one specific example, the thermal battery configuration has a length of about 3-8 inches, and in one specific embodiment, from about 4-5 inches. The thermal battery configuration may have a diameter of about 2-7 inches, and in one specific embodiment, from about 3 to 4 inches. The thermal battery configuration may have a weight of about 1-8 pounds, and in one specific embodiment, from about 4 to 5 pounds. The volume of the thermal battery may be about 6-100 in$^3$.

The thermal battery configuration may have a LAN anode 38. A LAN anode is an abuse-resistant thermal battery anode, particularly under high rate discharge and open circuit. The thermal battery configuration may have an iron disulfide cathode 44. The thermal battery configuration may have a ternary electrolyte 42. The thermal battery case 26 may be a stainless steel case. It should be understood that a titanium case may be used if weight is critical, although adding expense to the manufacturer. The thermal battery configuration may have glass to metal sealed electrical feedthroughs. One or more mounting features may be provided on the case in order to facilitate installation.

Figure 5:
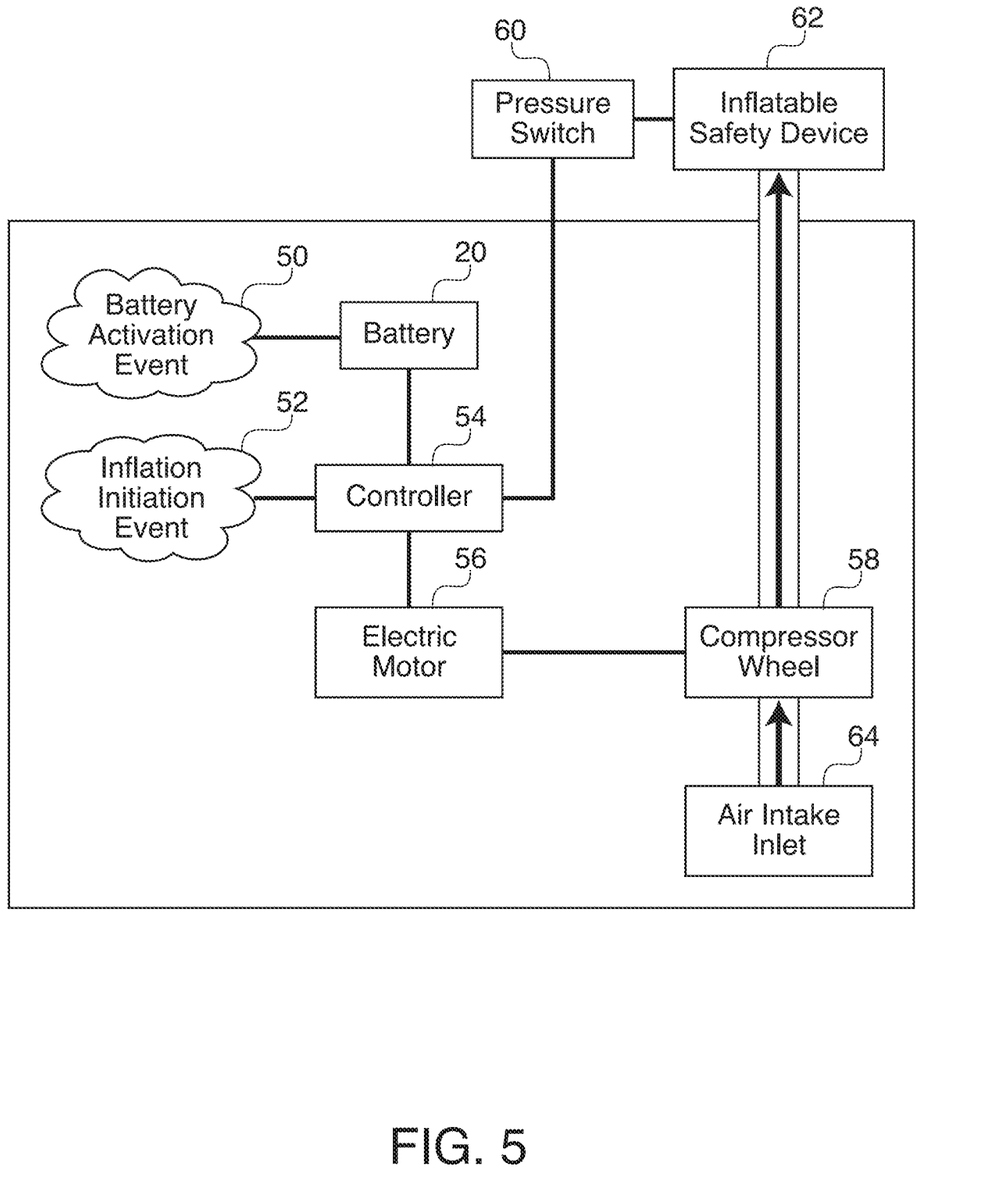
FIG. 5 is a schematic flow chart illustrating operation of an inflation system in order to inflate an inflatable structure.

The system may be provided with inflation device-specific features. These inflation device-specific features can be provided so that the battery is triggered to activate the motor only upon a particular occurrence or event. As illustrated by the schematic of FIG. 5, an inflation sequence has two primary "activation events." One event is the "battery activation event" 50 which event activates the thermal battery activation mechanism in order to melt electrolyte and turn the battery into an active voltage source. The "battery activation event" 50 is outlined in more detail by FIG. 6. Another event is the "inflation initiation event" 52, which event activates inflation of the inflatable safety device (tells controller to send power from the battery to the motor). The "inflation initiation event" 52 is outlined in more detail by FIG. 7. The battery activation event 50 occurs first, and once the battery is an active voltage source, whenever the inflation initiation event 52 occurs, power from the thermal battery 20 is sent to the motor, which begins inflation of the inflatable safety device.

Figure 6:
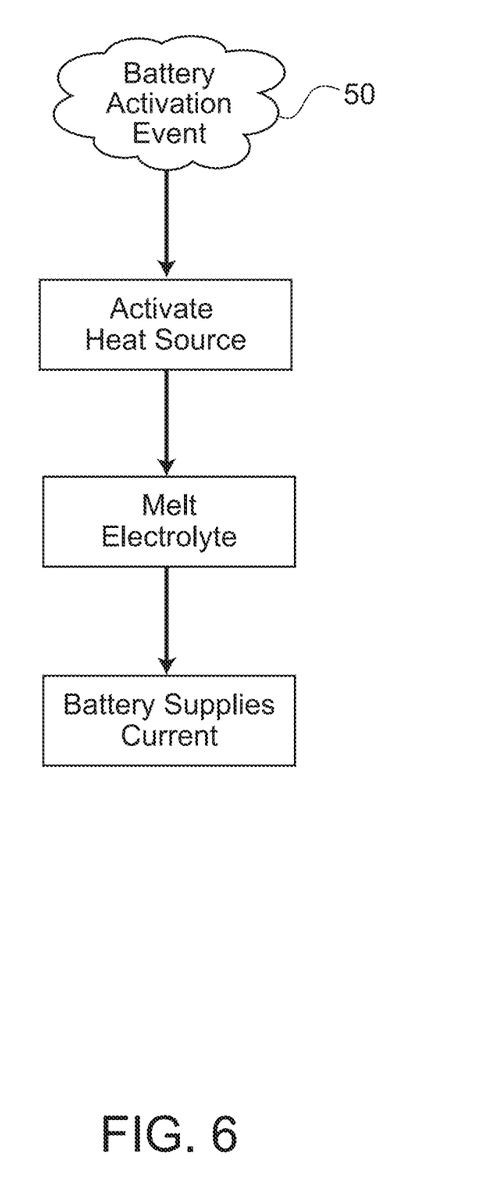
FIG. 6 is a schematic flow chart illustrating steps of battery activation after a battery activation event.

The battery activation event 50 may be a specific event that occurs at the beginning of an emergency situation. In one example, the battery may be associated with a sensor. The sensor can detect motion of the door that supports the inflatable safety device. Motion or opening of the door itself, or motion of the door handle, can activate the battery activation mechanism of the thermal battery. In a specific example, this motion can cause an electrical activation of the battery activation mechanism. In another example, this motion can cause a mechanical activation of the battery activation mechanism. Mechanical activation may occur via a cable, pin, pull cord, (or any other appropriate mechanical connection between the door and battery) that tensions or releases, which activates the battery activation mechanism. In a specific example, opening of the door or movement of the door handle mechanically pulls or otherwise engages/releases a release feature such as a cable/pin, cord, webbing (or any other option) which can cause activation of the battery activation mechanism. As shown by FIG. 6, this battery activation event causes the battery activation mechanism to ignite or otherwise activate a heat source. Heat source examples may be one or more heat pellets, heat discs, heat cartridges, or any other appropriate heat source. This causes melting of the electrolyte, which provides an active voltage or battery current available for delivery to the electric motor. In this example, activation may be without the employment of any electrical battery actuation components. The opening of the door or motion of the door handle may otherwise mechanically activate the thermal battery and deployment of the inflatable device without the employment of any electrical battery actuation components.

In another example, the battery activation event 50 may be activated by a crew member. In a specific embodiment, the battery activation event 50 of the thermal battery (which may also be referred to herein as an electrolyte heating device or a pyrotechnic) is activated via a signal from the cockpit. In the event of an emergency landing, the pilot can activate the battery in order to begin activation of the battery, which can potentially lessen a potential of accidental slide deployment.

In another example, the battery activation event 50 of the thermal battery may be activated via a signal from one of the pilots, flight attendants, passengers or other crewmembers. This may be an electronic signal or a mechanical activation. For example, there may be a mechanical activation such that a crew member pulls a cable, which pulls a pin, which allows a mechanical spark to start activation of the battery.

In another embodiment, the battery activation event 50 of the thermal battery may be activated by a standby electrical device. Exemplary standby electrical devices may be a battery, a capacitor, an electrical generator, aircraft power, or any other appropriate electrical device, or any combination thereof. In this example, the standby electrical device can detect the need for use and send a voltage to the battery activation mechanism of the thermal battery in order to begin activation.

If the battery is associated with a life raft only, it is possible for the battery activation event 50 to be triggered when the life raft is removed from a compartment or fuselage of the aircraft. If the battery is associated with a life vest only, it is possible for the battery activation event 50 to be triggered when the life vest is removed from a storage compartment of the aircraft.

Once the battery activation event 50 occurs, the battery is "alive" and ready to deliver voltage/power to the motor when needed. Referring back to FIG. 5, battery voltage/power is available to be delivered to the motor 56 via a signal from a controller 54.

The controller 54 may be an Electronic Speed Control (ESC). The ESC can convert the battery power to three phase electric for use by the motor 56, such as a brushless motor. The controller 54 may receive and process input upon an inflation initiation event 52, such as receiving input from a pull cord, a pressure sensor, a water sensor, or a manual activation switch to determine when to activate the electric motor 56, options of which are further described below.

The inflation initiation event 52 that activates the controller 54 (which in turn activates the electric motor 56) may be any number of events. In a first example, the event 52 may be time-based, such that a certain amount of time after the battery activation event 50, the inflation initiation event 52 will activate the controller 54. In a specific example this may simply be a matter of seconds or milliseconds. A timer may be provided that only activates the controller 54 a specified amount of time after the battery activation event 50. In a further example, activation of battery itself can activate the controller 54 or otherwise function as the inflation initiation event 52. In another example, the inflation initiation event 52 may occur when the slide/raft/vest pack is removed from its storage compartment. The inflation initiation event 52 may occur via dropping of the pack via gravity. The inflation initiation event 52 may occur via the ejection of the pack via an ejection system. The inflation initiation event 52 may occur via a rip cord, switch, or pull pin that is caused to be activated or released (either via gravity or by aircraft personnel). The inflation initiation event 52 may be activated via a second sensor or switch connected to the door that activates the controller 54 once the door has been opened a certain amount. In another example, the inflation initiation event 52 could be activated via remote control. In a further example, the inflation initiation event 52 could be water contact or a water-activated trigger activated by a water contact/presence sensor. In another example, the inflation initiation event 52 could be the orientation or movement of the system. Any combinations of any of these inflation initiation events 52 are also possible and considered within the scope of this disclosure.

Figure 7:
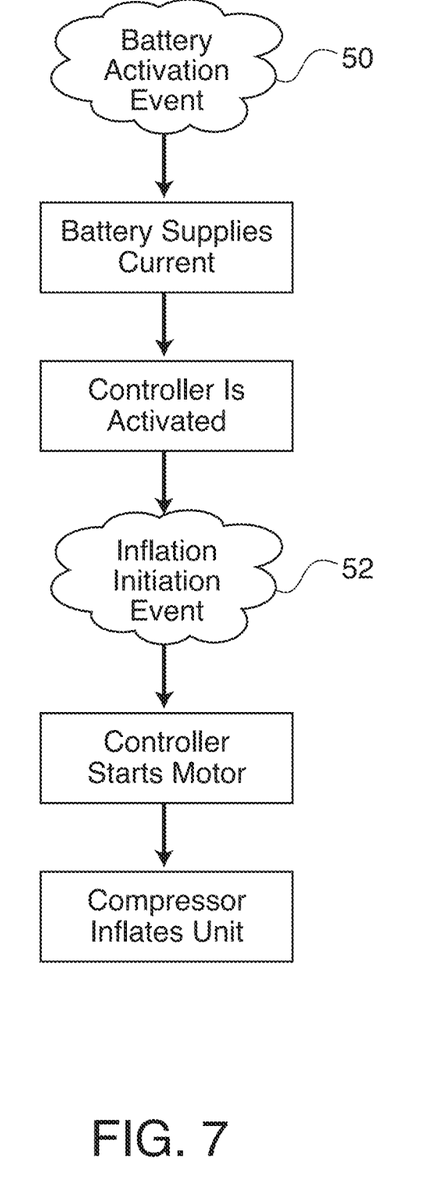
FIG. 7 is a schematic flow chart illustrating steps of inflation.

As outlined by FIG. 7, upon an inflation initiation event 52, as long as the battery is active and supplying current, a controller 54 is activated in order to send a signal to the electric motor 56 to begin. Electrical current will be transmitted from the thermal battery 50 to power the motor 26. Powering up of the electric motor 56 causes movement of a compressor wheel 58, which begins inflation of the inflatable safety device 62. Movement of the compressor wheel 58 generates a rotational force that creates vacuum to pull ambient air through the air intake inlet 64, diagonally across compressor wheel blades, out the exit, and into the inflatable safety device 62. The motor 56 may run the compressor wheel 58 until a specified pressure is reached and then switch off. Pressure may be sensed by a pressure switch 60 which is in communication with both the inflatable safety device 62 and the controller 54. The electric motor 28 can be configured to continue to run and maintain pressure in the inflatable structure as long as needed.

Providing a separate inflation initiation event 52 in order to activate the controller 54 once the slide and/or slide/raft is in the desired position can provide a safety feature so that the slide or slide/raft does not inflate too early (e.g., inside the aircraft). This can be particularly important for activation of a life raft. For example, this delay feature between battery activation 50 and inflation initiation 52 can provide crewmembers with a defined amount of time in order to position the life raft where needed (i.e., eject the life raft from the aircraft to a water source) before raft inflation is activated. For example, certain regulations require that a life raft be usable within 60 seconds. Accordingly, it is possible for the battery to be activated within 10-30 seconds from the removal event, still allowing additional time for inflation.

In another example, the system is provided with leak detection or low inflation pressure detection. If there is a leak in the inflatable device, the system may be designed such that it is able to detect that leak (or otherwise sense a lowered pressure of the inflatable device), and turn the motor back on in order to continue inflation or increase inflation. For example, the system may be provided with a pressure monitor associated with the motor and battery. If inflation pressure of the inflatable device drops below a predetermined threshold, the monitor can send a signal to switch the motor back on.

For example, a battery-powered motor 56 used on an evacuation slide could maintain the desired inflation pressure of the evacuation slide for an entire evacuation duration. This can allow for a reduction in air-holding requirements for the inflatable system and/or for the air-holding fabric itself. It is possible for a battery-powered electric motor 56 to store extra energy to top off a leaking unit. This could keep a punctured unit operational. An electric or battery powered system can be cycled on and off if need be. For example, the system may cycle on and off depending upon the pressure sensed by an optional pressure sensor 60. For example, the system may be provided with a pressure transducer to monitor inflatable pressure. In one example, the system may be caused to inflate the inflatable safety device to about 1.5 psig and then turn off the compressor. The compressor may then be turned back on if/when the inflatable safety device's pressure drops to 1.0 psig or below. There may also be provided a manual override switch.

The thermal battery 20 may be located in direct contact with the motor 56, such that the thermal battery is mounted with respect to the motor. In an alternate option, the thermal battery may be positioned at a distance from the motor. It is generally desirable that the thermal battery be positioned within at least about 12 feet from the motor/compressor. In some aircraft there may be one thermal battery per motor. In other types of aircraft, there may be one thermal battery per multiple motors. For example, a thermal battery may be centrally located with respect to two or more motors.

In some examples, it is possible for the thermal battery to be located on the inflatable device. In other examples, it is possible for the thermal battery to be located on the packboard assembly or in the enclosure of the inflatable device. In other examples, it is possible for the thermal battery to be located on an aircraft door. In other examples, it is possible for the power source to be directly integrated into the inflation system.

Features and benefits of use of the disclosed thermal battery in connection with an electrically-powered inflation system include but are not limited to:
 the thermal battery remains inert until activated;
 extended storage life (which may be 50+ years);
 a wide temperature range for storage and operation (e.g., in certain testing examples, these ranged from about −65° F. to about 185° F. in a thermal chamber);
 a wide pressure range for storage and operation;
 high performance at wide range of temperatures and pressures;
 high power-to-weight ratio (in some examples, the battery can deliver about 15-20 kW of power for the required short duration and can have a weight as low as 4-5 pounds);
 high power-to-volume ratio;
 the battery is capable of withstanding high g-forces, vibration, and other environmental factors;
 the battery can generally support the required voltage and supply a high discharge rate (e.g., about 300-400 amps). It is generally desirable to stay below about 60 volts for safety purposes, so voltages may be modified as necessary. For example, ranges may be about 40 volts×300 amps (to deliver about 12 kW of power); 60 volts×200 amps; 80 volts×150 amps. If 10 kW of power are needed, the ranges may be about 40 volts×250 amps; 60 volts×166 amps, or any other appropriate options. As background, power is (watts) is measured as voltage combined with current (amps). The higher the voltage, the lower the current, and the smaller the electronics can be, so there is a benefit to maximizing voltage, while also maximizing safety considerations.

The compressor wheel 58, battery 20, and electric motor 56 may be selected to cooperate with one another in order to deliver optimal and desired inflation characteristics. For example, the size of the compressor wheel 56 and the size of the inflatable safety device 62 may dictate the size of the electric motor 56 and battery 20 required for use.

Exemplary inflation parameters for various types of inflatable safety devices are provided in the below table.

| Type of inflatable safety device | Required Power | Expected battery volume |
|---|---|---|
| Large Slide/225 cubic feet per chamber and up | 10-20 kW | 25-100 cubic inches |
| Medium Slide/125 to 225 cubic feet per chamber | 7-15 kW | 20-60 cubic inches |
| Small Slide/Less than 125 cubic feet per chamber | 5-10 kW | 15-50 cubic inches |
| Rafts | 100 to 2000 Watts | 6 to 50 cubic inches |
| Life jackets | 5-50 Watts | 0.5-5 cubic inches |
| Shelters | 50-2000 Watts | 10-100 cubic inches |

Benefits of using an electric or battery-powered motor are that there is no need to house or store any type of gas. Unlike a compressed gas system, there are no primary leak paths while the mixed flow compressor inflation system is waiting to be deployed. It is expected that an electric system will deliver a similar performance regardless of temperature, unlike the use of compressed gas. (A typical compressed gas inflation system provides lower pressure in cold conditions. Units inflated with hot gases from gas generators can lose pressure as the hot gas cools.) An electric or battery-powered motor is also less dangerous than compressed gas and gas generator inflation systems.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. An inflation system for an inflatable safety device, comprising:
   an electrically-powered motor;
   a thermal battery that provides a power source for the electrically-powered motor,
   wherein the thermal battery is activated upon a battery activation event, wherein the battery activation event comprises one or more of:
   motion or opening of a vehicle door or handle;
   manual activation via a mechanical connection between the vehicle door or handle and the thermal battery;
   activation or tensioning of a release feature, cable, cord, pin, or webbing;
   electrical activation;
   a signal from a cockpit;
   a standby electrical device;
   wherein once the thermal battery is activated, power from the thermal battery is delivered to the electrically-powered motor upon an inflation initiation event after the battery activation event, wherein powering of the motor causes inflation of the inflatable safety device.

2. The system of claim 1, further comprising a sensor that can detect movement of the door or handle in order to function as a battery activation event.

3. The system of claim 1, wherein the inflation initiation event comprises one or more of:
   a time-based activation, such that a certain amount of time after the battery activation event, a timer activates a controller to activate the motor;
   activation of battery itself activates the controller;
   removal of the inflatable safety device from its storage compartment;
   dropping of the inflatable safety device via gravity;
   an ejection of a pack via an ejection system;
   via a rip cord, cord, cable, webbing, switch, or pull pin that is caused to be activated either via gravity or by aircraft personnel or occupants;
   via a second sensor or switch connected to the door that activates a controller once the door has been opened a certain amount;
   via remote control;
   via water contact or a water activated trigger activated by a water contact/presence sensor;
   via orientation or movement of the system;
   or any combination thereof.

4. The system of claim 1, further comprising a pressure sensor or switch that can monitor inflation pressure, wherein if inflation pressure drops below a predetermined threshold, a signal is sent to switch the electrically-powered motor back on.

5. The system of claim 1, wherein the thermal battery is in direct contact with the electric powered motor or is positioned a distance from the electric powered motor.

6. The system of claim 1, wherein the thermal battery is located on the inflatable safety device, on a packboard assembly, in an enclosure of the inflatable safety device, in a carrying case container, or on a vehicle door.

7. The system of claim 1, wherein the inflatable safety device comprises an evacuation slide and wherein the thermal battery delivers about 5-20 kW of power.

8. The system of claim 1, wherein the inflatable safety device comprises a life raft and wherein the thermal battery delivers about 100-2000 watts of power.

9. The system of claim 1, wherein the inflatable safety device comprises a life jacket and wherein the thermal battery delivers about 5-50 watts of power.

10. The system of claim 1, wherein the inflatable safety device comprises an inflatable shelter and wherein the thermal battery delivers about 50-2000 watts of power.

11. The system of claim 1, wherein the thermal battery comprises a load profile that provides a high burst of power within at least about 3-60 seconds and provides a sustained option for powering the electric powered motor during inflation and relevant usage time of the inflatable safety device.

12. The system of claim 1, wherein the thermal battery has a volume of about 6-100 cubic inches.

13. The system of claim 1, wherein the thermal battery comprises a molten salt battery with a plurality of cells comprising a salt electrolyte, an anode, and a cathode, wherein the plurality of cells are enclosed by a battery case, wherein the salt electrolyte is solid and inactive at temperatures in a range of −65° F. to 185° F. and undergoes a phase change to liquid once activated via a battery activation mechanism.

* * * * *